(12) United States Patent
Thakar et al.

(10) Patent No.: US 11,966,350 B2
(45) Date of Patent: Apr. 23, 2024

(54) CONFIGURABLE STORAGE SERVER WITH MULTIPLE SOCKETS

(71) Applicant: Cisco Technology, Inc., San Jose, CA (US)

(72) Inventors: Anant Thakar, Los Altos, CA (US); Yun Bai, Shanghai (CN)

(73) Assignee: Cisco Technology, Inc., San Jose, CA (US)

( * ) Notice: Subject to any disclaimer, the term of this patent is extended or adjusted under 35 U.S.C. 154(b) by 28 days.

(21) Appl. No.: 16/476,532

(22) PCT Filed: Feb. 5, 2018

(86) PCT No.: PCT/CN2018/075219
§ 371 (c)(1),
(2) Date: Jul. 8, 2019

(87) PCT Pub. No.: WO2019/148482
PCT Pub. Date: Aug. 8, 2019

(65) Prior Publication Data
US 2021/0406212 A1    Dec. 30, 2021

(51) Int. Cl.
*G06F 13/40* (2006.01)
*G06F 9/445* (2018.01)
(52) U.S. Cl.
CPC ...... *G06F 13/4068* (2013.01); *G06F 9/44505* (2013.01)
(58) Field of Classification Search
CPC ..... H04L 41/12; H04L 41/0893; H04L 67/12; H04L 43/00; H04L 41/0806; H04L 41/22;
(Continued)

(56) References Cited

U.S. PATENT DOCUMENTS 4,979,096 A * 12/1990 Ueda ................... G06T 1/20
709/212
5,588,122 A * 12/1996 Garcia .................. G06F 13/24
710/48
(Continued)

FOREIGN PATENT DOCUMENTS

CN   101278264 A   10/2008
CN   101877700 A   11/2010
(Continued)

OTHER PUBLICATIONS

PCT International Search Report for Application No. PCT/CN2018/075219 dated Nov. 1, 2018.
(Continued)

*Primary Examiner* — Faisal M Zaman
(74) *Attorney, Agent, or Firm* — Patterson + Sheridan, LLP

(57) ABSTRACT

Embodiments herein describe a computing system which is reconfigurable into different server configurations that have different numbers of sockets. For example, the computing system may include two server nodes which can be configured into either two independent servers (i.e., two 2S servers) or a single server (i.e., one 4S server). In one embodiment, the computing system includes a midplane which is connected to processor buses on the server nodes. When configured as a single server, the midplane connects the processor bus (or buses) on one of the server nodes to the processor bus or buses on the other server node. In this manner, the processors in the two server nodes can be interconnected to function as a single server. In contrast, the connections between the server nodes in the midplane are disabled when the server nodes operate as two independent servers.

17 Claims, 8 Drawing Sheets

(58) Field of Classification Search
CPC ..... H04L 29/06; H04L 63/0428; H04L 43/16;
H04L 51/046; H04L 63/0281; H04L
63/18; H04L 67/327; G06F 13/385; G06F
21/602; G06F 21/78; G06F 21/85; G06F
13/4022; G06F 13/4081; G06F 21/80;
G06F 7/58
USPC ...... 370/392; 710/52, 104, 15, 20, 300, 315;
709/223
See application file for complete search history.

(56) References Cited

U.S. PATENT DOCUMENTS

| | | | | |
|---|---|---|---|---|
| 5,659,781 | A * | 8/1997 | Larson | H04L 12/433 712/19 |
| 5,778,202 | A * | 7/1998 | Kuroishi | G06F 13/4095 709/251 |
| 5,799,173 | A * | 8/1998 | Gossler | G06F 9/5027 703/22 |
| 5,974,051 | A * | 10/1999 | De Nicolo | H04L 12/413 370/438 |
| 6,453,406 | B1 * | 9/2002 | Sarnikowski | H04L 45/06 712/11 |
| 6,473,857 | B1 * | 10/2002 | Panas | G06F 15/177 709/222 |
| 6,687,837 | B1 * | 2/2004 | Beck | G06F 1/26 713/300 |
| 6,886,038 | B1 * | 4/2005 | Tabbara | H04L 69/329 709/224 |
| 6,894,969 | B1 * | 5/2005 | Chidambaran | H04L 12/5601 370/216 |
| 7,043,586 | B2 * | 5/2006 | Benson | G06F 13/409 710/301 |
| 7,164,676 | B1 * | 1/2007 | Chakraborty | G06F 16/2386 709/213 |
| 7,516,537 | B1 * | 4/2009 | Reger | G06F 3/0626 248/682 |
| 7,590,727 | B1 * | 9/2009 | Barnes | G06F 11/2023 709/212 |
| 8,775,704 | B2 * | 7/2014 | Frid | G06F 13/00 710/305 |
| 10,694,635 | B1 * | 6/2020 | Rivnay | H05K 7/1491 |
| 10,715,587 | B2 * | 7/2020 | Pell | H04L 67/1001 |
| 2002/0007410 | A1 * | 1/2002 | Seagren | G06F 11/1482 709/227 |
| 2003/0023702 | A1 * | 1/2003 | Kokku | H04L 9/40 709/216 |
| 2003/0167345 | A1 * | 9/2003 | Knight | H04L 12/46 701/1 |
| 2003/0177273 | A1 * | 9/2003 | Nakamura | G06F 15/167 709/251 |
| 2003/0200345 | A1 * | 10/2003 | Ramsey | H04N 21/226 709/204 |
| 2004/0109406 | A1 * | 6/2004 | Rothman | H04L 67/1002 370/216 |
| 2004/0202182 | A1 * | 10/2004 | Lund | H04L 25/14 370/395.21 |
| 2004/0230752 | A1 * | 11/2004 | Blake | G06F 12/0831 711/146 |
| 2005/0108381 | A1 * | 5/2005 | Hunt | H04L 41/042 709/223 |
| 2006/0031622 | A1 * | 2/2006 | Jardine | G06Q 10/00 710/310 |
| 2006/0203460 | A1 * | 9/2006 | Aviv | H05K 7/1492 361/733 |
| 2007/0136311 | A1 * | 6/2007 | Kasten | H04L 69/14 |
| 2007/0204088 | A1 * | 8/2007 | Chen | H05K 7/1492 710/301 |
| 2007/0268830 | A1 * | 11/2007 | Li | H04L 49/506 370/235 |
| 2008/0114918 | A1 * | 5/2008 | Bingi | G06F 13/4265 710/300 |
| 2011/0016201 | A1 | 1/2011 | Ishiki et al. | |
| 2012/0215954 | A1 * | 8/2012 | Bandholz | G06F 1/24 710/104 |
| 2012/0269514 | A1 * | 10/2012 | Nedovic | H04B 10/801 398/66 |
| 2013/0201819 | A1 * | 8/2013 | Hu | H04L 41/0668 370/219 |
| 2013/0282944 | A1 * | 10/2013 | Shaw | G06F 1/186 710/305 |
| 2013/0346756 | A1 * | 12/2013 | Cook | G06F 21/00 711/E12.001 |
| 2014/0016637 | A1 * | 1/2014 | Masood | H04L 49/25 370/390 |
| 2014/0095874 | A1 | 4/2014 | Desai et al. | |
| 2014/0317441 | A1 * | 10/2014 | Arata | G06F 11/2028 714/4.12 |
| 2015/0156117 | A1 * | 6/2015 | Zhao | H04L 47/125 709/223 |
| 2015/0293868 | A1 * | 10/2015 | Hishida | G06F 11/2092 710/38 |
| 2015/0351233 | A1 * | 12/2015 | Peterson | H05K 1/141 361/785 |
| 2016/0004292 | A1 * | 1/2016 | Sharda | G06F 13/4022 710/317 |
| 2016/0012006 | A1 * | 1/2016 | Motamedi | G06F 13/409 710/301 |
| 2016/0072883 | A1 * | 3/2016 | Long | G06F 11/00 709/219 |
| 2016/0342186 | A1 * | 11/2016 | Ragupathi | G06F 1/28 |
| 2017/0019247 | A1 * | 1/2017 | Iyer | H04L 1/243 |
| 2017/0023732 | A1 * | 1/2017 | Watanuki | G02B 6/43 |
| 2017/0046291 | A1 | 2/2017 | Borkenhagen et al. | |
| 2017/0090967 | A1 * | 3/2017 | Ramasubramanian | G06F 9/5083 |
| 2017/0177528 | A1 * | 6/2017 | Harriman | G06F 13/4282 |
| 2017/0315944 | A1 | 11/2017 | Mayer et al. | |
| 2018/0019953 | A1 | 1/2018 | Odisho et al. | |
| 2018/0227963 | A1 * | 8/2018 | Kamgaing | H04B 1/48 |
| 2018/0357102 | A1 * | 12/2018 | Shetler | G06F 13/161 |
| 2019/0004921 | A1 * | 1/2019 | Fahim | G06F 11/349 |
| 2019/0373754 | A1 * | 12/2019 | Norton | H05K 7/1491 |
| 2021/0406212 | A1 * | 12/2021 | Thakar | G06F 15/17337 |

FOREIGN PATENT DOCUMENTS

| | | |
|---|---|---|
| CN | 102929819 A | 2/2013 |
| CN | 104508594 A | 4/2015 |
| CN | 104750631 A | 7/2015 |
| CN | 105184113 A | 12/2015 |
| CN | 106385448 A | 2/2017 |

OTHER PUBLICATIONS

PCT Written Opinion of the International Searching Authority for Application No. PCT/CN2018/075219 dated Nov. 1, 2018.
European Patent Office, Extended European Search Report for Application 18904321.9 dated Aug. 17, 2021.
Chinese Patent Office, First Office Action for Application 201880008186.1 dated Sep. 7, 2021.
Chinese Patent Office, Second Chinese Office Action for Application 201880008186.1 dated Nov. 26, 2021.
National Intellectual Property Administration, PRC, Rejection Decision for Application 201880008186.1 dated Feb. 16, 2022.
Chinese Patent Office, Third Chinese Office Action for Application 201880008186.1 dated Oct. 12, 2022.
Chinese Patent Office, Third Office Action for Chinese Patent Application No. 201880008186.1, dated Nov. 29, 2022.
National Intellectual Property Administration, PRC, Rejection Decision for Application 201880008186.1 dated Feb. 9, 2023.

* cited by examiner

CONFIGURABLE STORAGE SERVER WITH MULTIPLE SOCKETS

CROSS-REFERENCE TO RELATED APPLICATIONS

This application claims benefit of PCT/CN2018/075219, filed Feb. 5, 2018. The aforementioned related patent application is herein incorporated by reference in its entirety.

TECHNICAL FIELD

Embodiments presented in this disclosure generally relate to changing the configuration of a multiple socket server.

BACKGROUND

Applications can execute differently depending on the configuration of the underlying hardware. For example, one application may experience large performance gains when executed on a four-socket (4S) server instead of a two-socket (2S) server while another application may experience minimal or no gain when executed on a 4S server rather than a 2S server. Generally, a "socket" is a connection for plugging a processor (e.g., a central processing unit (CPU)) into a printed circuit board (PCB) in the server. Thus, a 4S server has four sockets (and four corresponding CPUs) while a 2S server has two sockets and two corresponding CPUs.

For many applications, predicting whether the application performs better in a 4S or 2S server is difficult. Even if a data center operator determines it is better to execute an application using 4S servers, at a later time, the 4S servers may execute a different application that would perform better on 2S servers. Thus, not only is it difficult for data center operators to predict which server configuration is best for executing known applications, it is even more difficult to predict which server configuration will be best for future or updated applications.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DESCRIPTION OF EXAMPLE EMBODIMENTS

Overview

One embodiment presented in this disclosure is a computing system that includes a first server node including a first socket, a second server node including a second socket, and a midplane including an inter-processor connection connected at a first end to a processor bus of the first socket and at a second end to a processor bus of the second socket at a second end. The computing system includes logic configured to change the first and second server nodes between a first server configuration in which the inter-processor connection is disabled and a second server configuration in which the inter-processor connection is enabled.

Another embodiment described herein is a method that includes configuring a first server node and a second server node in a same computing system in a first server configuration where the first server node comprises a first socket and the second server node comprises a second socket. The method also includes configuring the first and second server nodes in a second server configuration using an inter-processor connection disposed in a midplane where the inter-processor connection is connected at a first end to a processor bus of the first socket and at a second end to a processor bus of the second socket. Moreover, the inter-processor connection is unused when the first and second server nodes are in the first server configuration.

Example Embodiments

Embodiments herein describe a computing system that is reconfigurable into different server configurations that have different numbers of sockets. For example, the computing system may include two server nodes which can be configured into either two independent servers (e.g., two 2S servers) or a single server (e.g., one 4S server). In one embodiment, the computing system includes a midplane that is connected to processor buses on the server nodes. When configured as a single server, the midplane connects the processor bus (or buses) on one of the server nodes to the processor bus (or buses) on the other server node. In this manner, the processors in the two server nodes can be interconnected to function as a single server. In contrast, the connections between the server nodes in the midplane are disabled when the server nodes operate as two independent servers. In this manner, the same hardware can be reconfigured as needed between two different server configurations.

Figure 1:
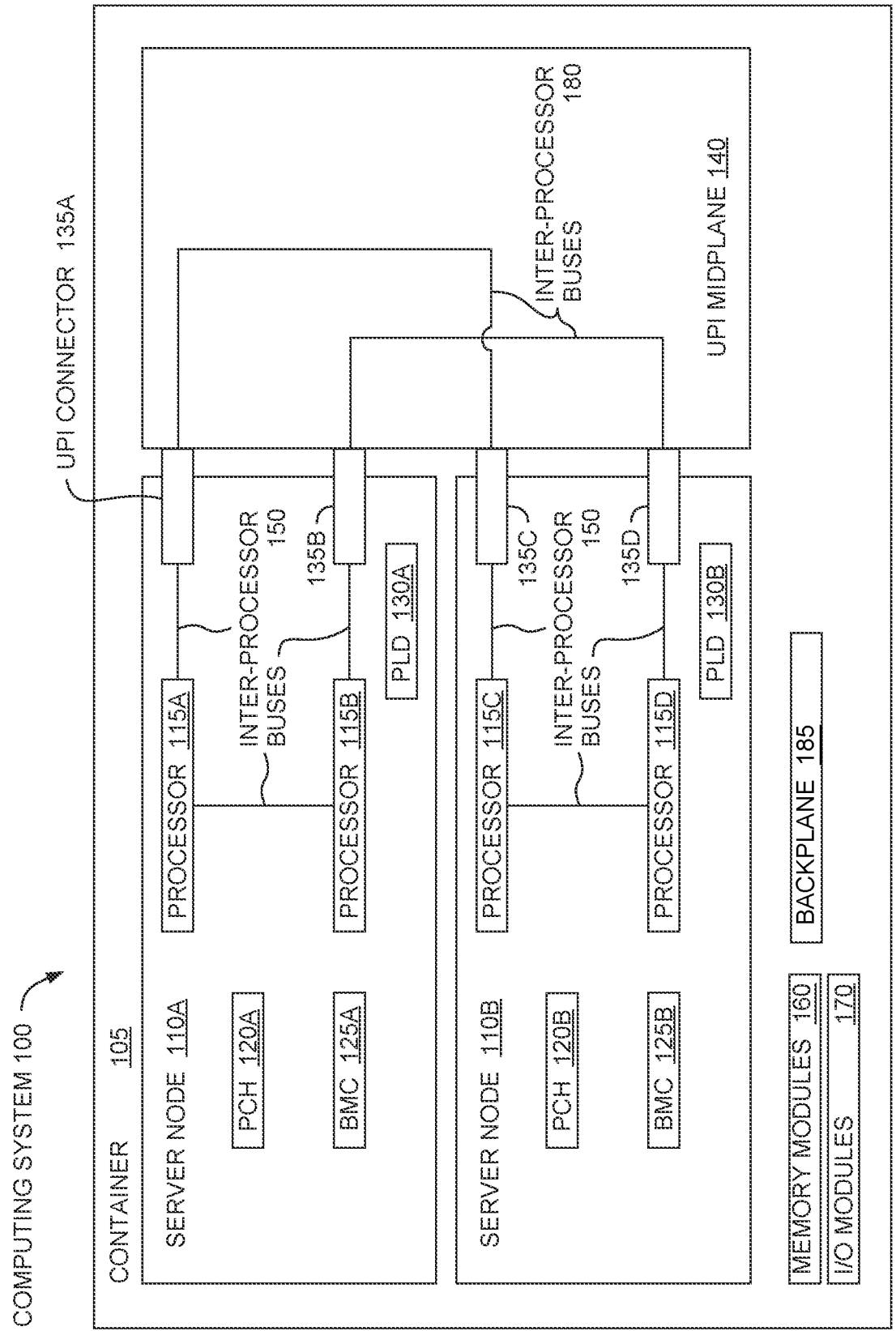
FIG. 1 illustrates a computing system that can be reconfigured into different server configurations, according to an embodiment described herein.

FIG. 1 illustrates a computing system 100 that can be reconfigured into different server configurations, according to an embodiment described herein. The computing system 100 includes a container 105 that encloses a server node 110A and a server node 110B. In one embodiment, the container 105 is mountable to a rack such that multiple computing systems 100 can be stacked on top of each other in a data center. The container 105 may have a substantially rectangular shape or any other form factor suitable for containing the hardware components described herein.

In FIG. 1, the server nodes 110 contain identical hardware components. In one embodiment, the server nodes 110 are identical blade servers that are mounted in the container 105 in a side by side or vertical manner (e.g., a stack). In this example, each of the server nodes 110 includes two processors 115 connected to two sockets to form a 2S server node. As described below, a UltraPath Interconnect (UPI) midplane 140 connects the inter-processor buses 150 of the processors 115 (or sockets) so that the two 2S server nodes can be reconfigured to form a single 4S server. That is, the computing system 100 can be configured into either two 2S servers (2×2S) or a single 4S server. However, other server configurations are also possible. For example, instead of containing two sockets, the server nodes 110 may each include one socket or four sockets. In those examples, the computing system 100 can be configured into a 2×1S server or a single 2S server, or a 2×4S servers or a 8S server.

In addition to the processors 115, the server nodes 110 include a peripheral controller hub (PCH) 120, a baseboard management controller (BMC) 125, and a programmable logic device (PLD) 130. In one embodiment, some or all of these devices may communicate with the corresponding devices in the other server node 110 in order to synchronize a booting-up sequence of the server nodes 110 when being configured as a 4S server. For example, the server nodes 110 may transmit control or handshaking signals so that the PCH 120, the BMC 125, and the PLD 130 power on the server nodes 110 in synch with each other.

In one embodiment, the PCH 120 controls data paths and support functions used by the processors 115. The PCH 120 may be powered on before the processors 115 when booting the server nodes 110. The BMC 125 is a service processor that monitors the state of the server nodes 110. For example, the BMC 125 may track which configuration the server nodes 110 are in—e.g., 2×2S or 4S. The BMC 125 may be connected to internal sensors (not shown) which measure power-supply voltage, fan speeds, and environmental conditions.

In one embodiment, the PLD 130 controls handshaking between the server nodes 110 when being configured as a 4S server. For example, the PLD 130 may control the order in which the hardware components in the server nodes 110 are booted or powered on to ensure the server nodes 110 are synchronized. The PLD 130 may also reset clock signals and generate various control signals for the PCH 120, the BMC 125, and the processors 115.

The computing system 100 includes UPI connectors 135 which connect inter-processor buses 150 in the server nodes 110 to inter-processor buses 180 on the UPI midplane 140. That is, the buses 180 on the UPI midplane 140 can be considered as extensions of the inter-processor buses 150 in the server nodes 110. As shown, the buses 180 couple the processor 115A in the server node 110A to the processor 115C in the server node 110B and the processor 115B in the server node 110A to the processor 115D in the server node 110B. As such, the inter-processor buses 180 connect the processors in different server nodes 110 in a similar manner as the inter-processor buses 150 which extend between the processor 115A and the processor 115B in the server node 110A and between the processor 115C and the processor 115D in the server node 110B. In one embodiment, the inter-processor buses 150 and 180 can be described as direct connections between the processor 115 so that the processors 115 can communicate.

The server nodes 110 may be coupled to a backplane 185 that provides additional communication paths between the server nodes 110. For example, the server nodes 110 may have a PCIe or Ethernet type connection to the backplane 185 which permits the server nodes 110 to transmit data to each other when operating in a 2×2S configuration. However, the communication paths in the backplane 185 are different since they are not processor buses 150 and 180 which provide direct connections between processors 115 on the same server node 110, or on different server nodes 110 using the midplane 140.

In one embodiment, the UPI midplane 140 contains a different substrate than the substrates of the server nodes 110. For example, the UPI midplane 140 may be formed on a different PCB than the PCBs of the server nodes 110 (which may be blade servers). The connectors 135 permit the buses 150 on the server nodes 110 to connect to the buses 180 on the midplane 140.

The container 105 also includes memory modules 160 and I/O modules 170. For example, the memory modules 160 may include hard disk drives or volatile memory modules (e.g., RAM). In one embodiment, the computing system 100 is a reconfigurable 2×2S or 4S non-uniform memory access (NUMA) storage server which stores information in the memory modules 160 for various applications (e.g., a database). The I/O modules 170 can permit the computing system 100 to couple to other computing systems (e.g., other 2S/4S storage servers) or to a network.

Figure 2:
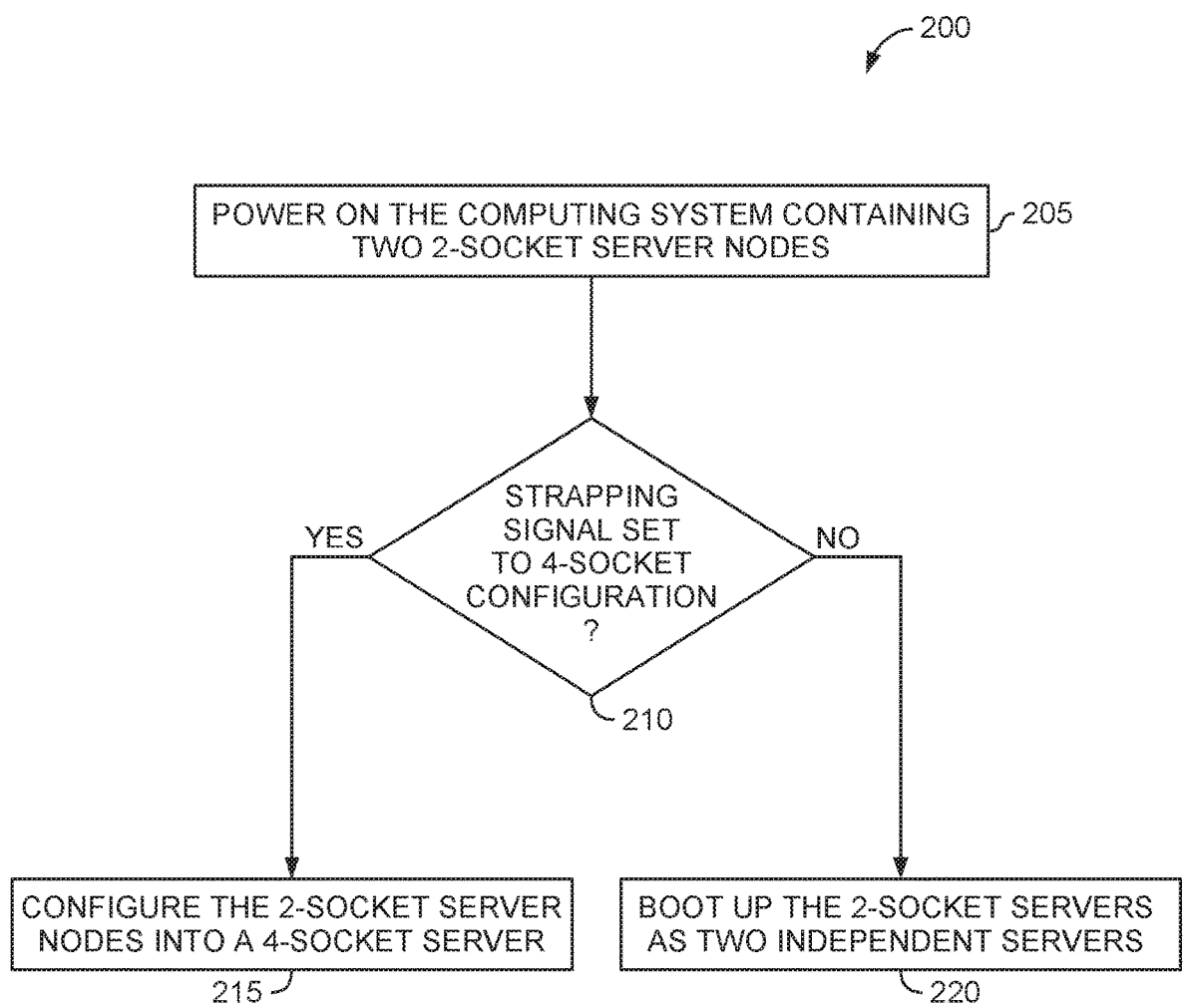
FIG. 2 is a flowchart for reconfiguring a computing system into different server configurations, according to an embodiment described herein.

FIG. 2 is a flowchart 200 for reconfiguring a computing system (e.g., the computing system 100 in FIG. 1) into different server configurations, according to an embodiment described herein. At block 205, power is provided to a computing system that contains two 2S server nodes. However, as mentioned above, in other embodiments, the reconfigurable computing system can include two 1S or two 4S server nodes instead.

The PLD in the server nodes generates a strapping signal that indicates whether the computing system should be configured as two independent 2S servers or one 4S server. At block 210, the chipset in the server nodes, e.g., the PCH and the BMC, determine if the strapping signal indicates the computing system should be configured as a 4S server. If yes, the method 200 proceeds to block 215 where the PLD configures the two 2S server nodes to function as a 4S server. For example, the computing system may have previously been configured as 2×2S servers. However, the system administrator may wish to change from 2S servers to a 4S server (referred to herein as "scaling up"). As such, the system administrator may use a user interface (e.g., a graphic user interface (GUI) in a web portal) to instruct the PLD to reconfigure the computing system as a 4S server. In response, the PLD reboots the computing system and begins the method 200.

Alternatively, the computing system may have previously been configured as a 4S server and the system administrator now wishes to reconfigure the computing system into two 2S servers (referred to herein as "scaling out"). As such, the query at block 210 is a "NO" and the method 200 proceeds to block 220 where the PLD boots up the 2S server nodes as two independent 2S servers. In this manner, the system administrator can scale up or out the computing system which may result in better performance of the applications executed by the computing system.

Figure 3:
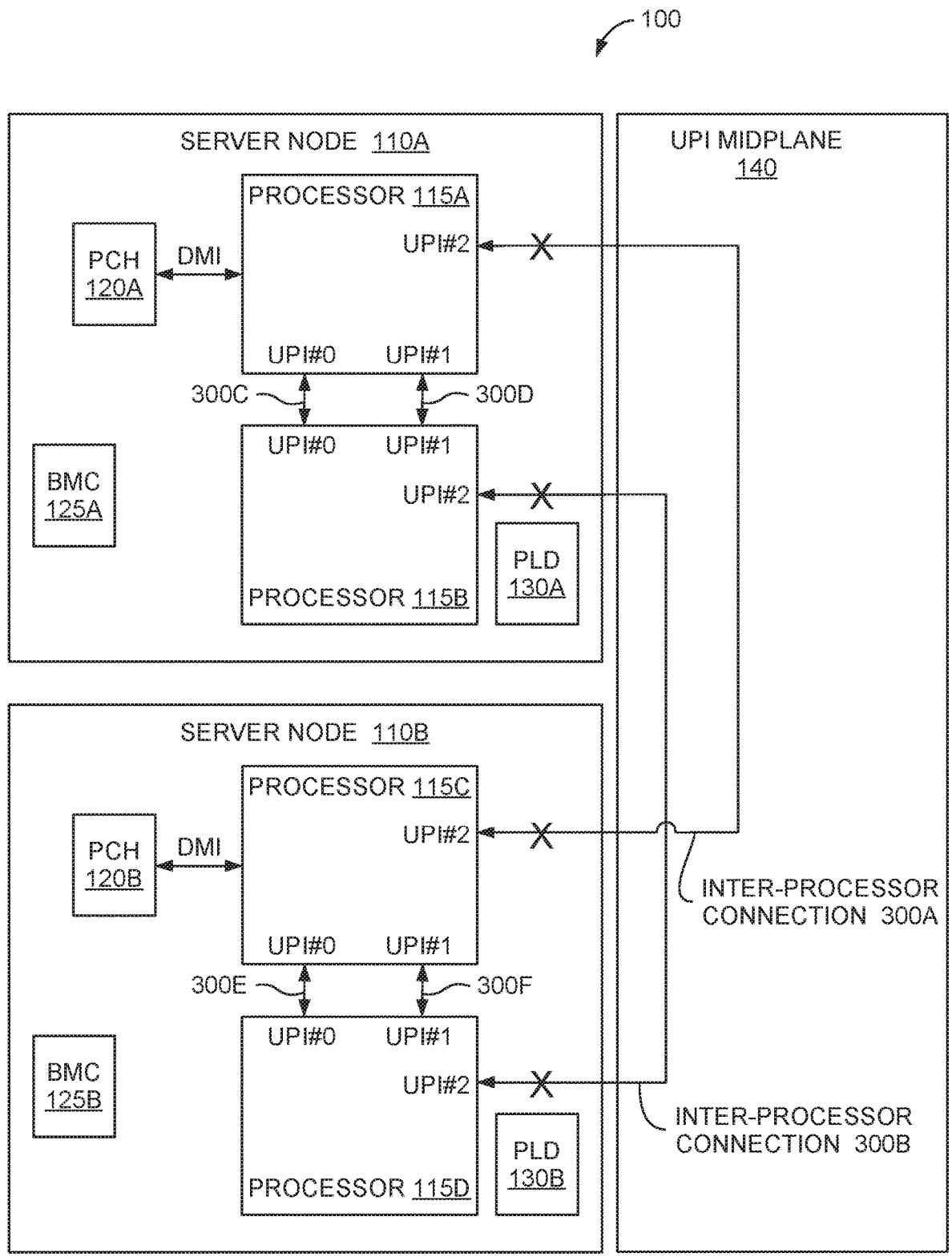
FIG. 3 illustrates a 2×2S configuration of the computing system in FIG. 1, according to an embodiment described herein.

FIG. 3 illustrates a 2×2S configuration of the computing system 100 in FIG. 1, according to an embodiment described herein. For simplicity, portions of the computing system 100 shown in FIG. 1 such as the container, memory modules, and I/O modules have been omitted from FIG. 3. In one embodiment, the 2×2S configuration shown here corresponds to block 220 of the method 200 where the server nodes 110 are configured into two independent servers.

The "X's" indicate inter-processor connections 300 that have been disabled or are unused. That is, in the 2×2S configuration, the inter-processor connection 300A between the processor 115A and the processor 115C and the inter-processor connection 300B between the processor 115B and the processor 115D are unused. In contrast, the inter-processor connections 300C and 300D between the processor 115A and the processor 115B and the inter-processor connections 300E and 300F between the processor 115C and the processor 115D are used.

In this example, each of the processors 115 include three UPI ports or interfaces labeled UPI #0, #1, and #2. The UPI #2 ports are connected to the inter-processor connections 300A and 300B and thus are unused in the 2×2S configuration. The UPI #0 and #1 ports, in contrast, are coupled to the inter-processor connections 300C, 300D, 300E, and 300F and are used. As such, the processors 115A and 115B and the processor 115C and 115D can communicate directly with each other, but the processors 115A and 115C and the processor 115B and 115D cannot communicate directly using an inter-processor connection. Instead, the server nodes 110 may be able to communicate using a different communication link in the computer system 100 such as a PCIe or Ethernet type backplane 185.

The server nodes 110 also illustrate a direct media interface (DMI) which permits the PCH 120 to communicate with at least one of the processors 115 in each of the server nodes 110. In one embodiment, the DMI includes multiple lanes and differential signaling to form a point-to-point link between the PCH 120 and the processors 115.

Figure 4:
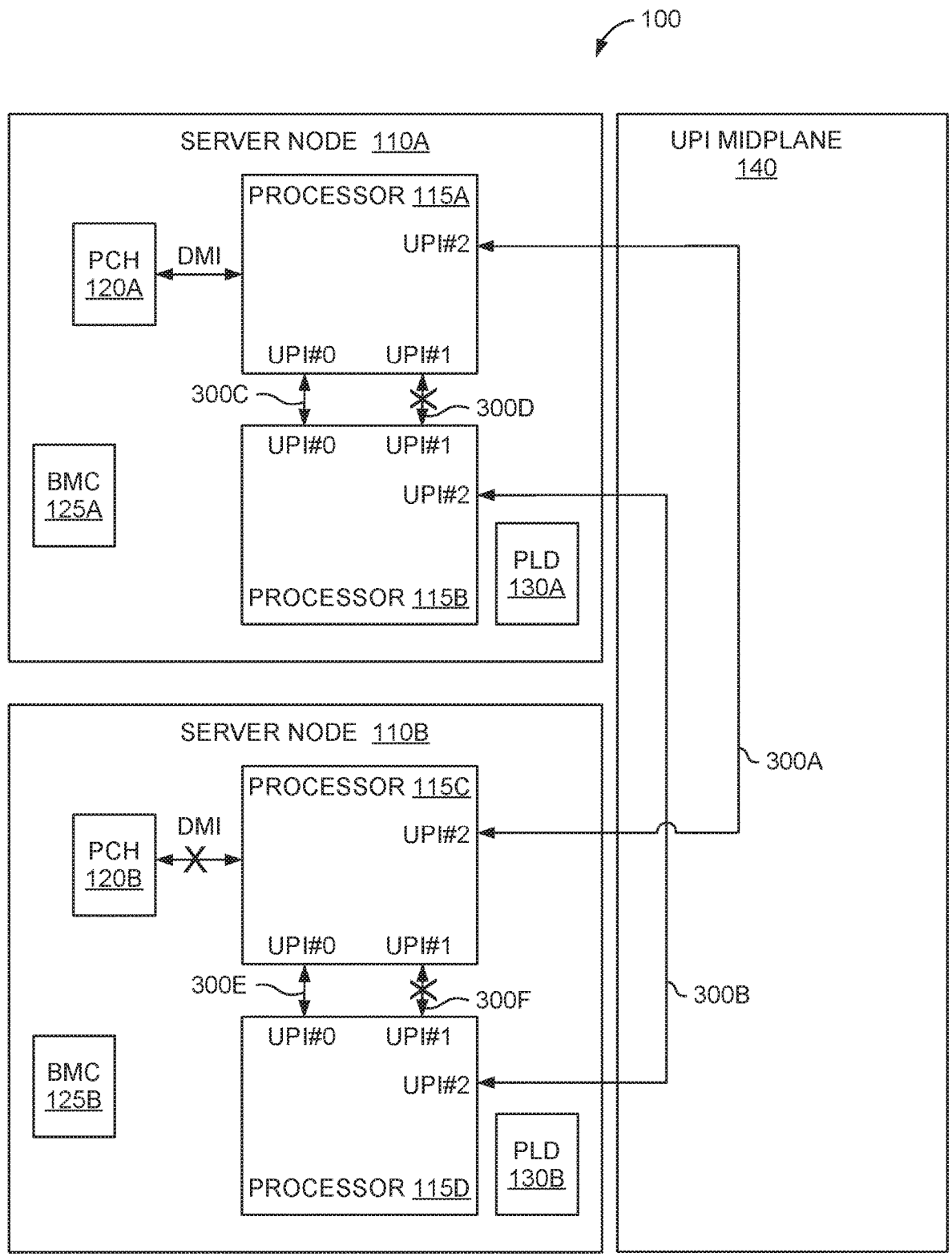
FIG. 4 illustrates a 4S configuration of the computing system in FIG. 1, according to an embodiment described herein.

FIG. 4 illustrates a 4S configuration of the computing system in FIG. 1, according to an embodiment described herein. In one embodiment, the 4S configuration shown here corresponds to block 215 of the method 200 where the server nodes 110 are configured into a single 4S server. Like in FIG. 3, the "X's" indicate inter-processor connections 300 that have been disabled or are unused.

In this configuration, the inter-processor connections 300A and 300B are active and permit processor-to-processor communication between the processors 115A and 115C and between the processors 115B and 115D. Moreover, like in FIG. 3, the inter-processor connections 300C and 300E are active and permit processor-to-processor communication between the processors 115A and 115B and between the processors 115C and 115D. However, unlike in FIG. 3, the inter-processor connections 300D and 300F are disabled or unused. In this example, the inter-processor connectors 300 form a ring topology between the sockets or processors 115 in the two server nodes 110.

In this example, the UPI #0 and #2 ports are active in each of the processors 115 while the UPI #1 ports are inactive or disabled. However, in another embodiment, the UPI #1 ports may also be active in which case the processors 115A and 115B can also transmit data using the inter-processor connection 300D and the processors 115C and 115D can communicate using the inter-processor connection 300F, which is different from the ring topology shown in FIG. 4.

In addition to disabling the inter-processor connections 300D and 300F, the computer system 100 also disables the DMI connection between the PCH 120B and the processor 115C. In one embodiment, when in the 4S configuration, the chipset for one of the server nodes 110 is selected as the master while the chipset in the other server node 110 is in standby mode (e.g., the chipset is not used unless the master chipset fails). In FIG. 4, the chipset in the server node 110B (i.e., the PCH 120B and the BMC 125B) is in the standby mode which means the DMI on the server node 110B is disabled. Instead, the processors 115C and 115D may receive instructions from the chipset in the server node 110A (i.e., the PCH 120A and the BMC 125A) when booting and powering on. In this manner, the two server nodes 110 are configured into a single 4S configuration where the sockets or processors in the two server nodes are interconnected using the inter-processor connections 300A and 300B in the midplane 140.

Figure 5:
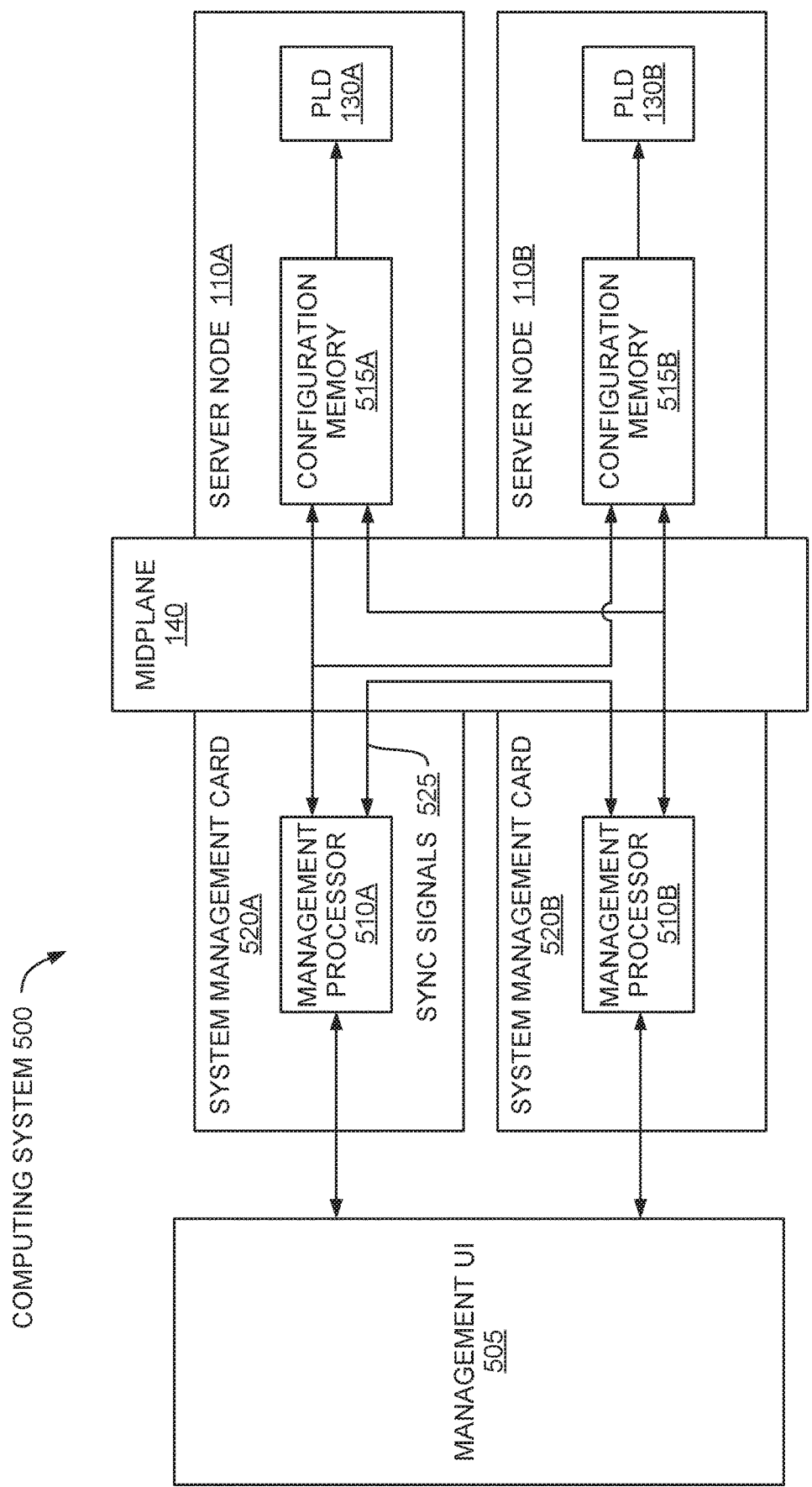
FIG. 5 illustrates a management user interface for controlling the server configuration of the computing system, according to an embodiment described herein.

FIG. 5 illustrates a management user interface (UI) 505 for controlling the server configuration of a computing system 500, according to an embodiment described herein. In one embodiment, the management UI 505 is part of a software application that permits the system administrator to control the configuration of the server nodes 110—e.g., a 2×2S or 4S configuration. For example, the management UI 505 (e.g., a GUI) may be part of a web portal accessed by the system administrator to change the configurations of the server nodes 110. As such, the system administrator does not need to be physically present at a data center containing the server nodes 110 but instead can reconfigure the server nodes 110 from any location that has access to the management UI 505.

The management UI 505 communicates with system management cards 520 which are communicatively coupled to the server nodes 110 via the midplane 140. The system management cards 520 may be disposed in the same container that includes the server nodes 110. As shown, the cards 520 include respective management processors 510 which share synchronization signals 525 to ensure the server nodes 110 are configured to have the same server configuration. In one embodiment, the management processors 510 are application specific integrated circuits (ASICs) which receive instructions from the management UI 505 regarding the desired configuration of the server nodes 110. Using the synchronization signals 525, the management processors 510 can ensure that the server nodes 110 are configured to the same state—e.g., a 2×2S configuration or a 4S configuration.

In FIG. 5, the management processors 510 are communicatively coupled to both of the server nodes 110 using the midplane 140. Thus, if one of the management processors 510 or system management cards 520 malfunctions, the other card 520 and management processor 510 can still communicate with the server nodes 110, thereby creating a high availability system. In one embodiment, the communication links in the midplane 140 used by the management processors 510 are different from the inter-processor buses 180 in the midplane 140 of FIG. 1 used by the sockets or processors in the server nodes to communicate. For example, the inter-processor buses may be high-speed buses while the links used by the management processors 510 are slower.

The management processor 510 can store configuration information in respective configuration memories 515. For example, when switching from the 2×2S configuration to the 4S configuration or vice versa, the management processors 510 update the information in the configuration memories

515. During the boot process, or when powering on the server nodes 110, the PLDs 130 access the configuration memories 515 to determine the desired configuration of the server nodes 110 and then generate control signals to the chipsets in the server nodes 110 which configure the server nodes 110 into the desired configuration.

Figure 6:
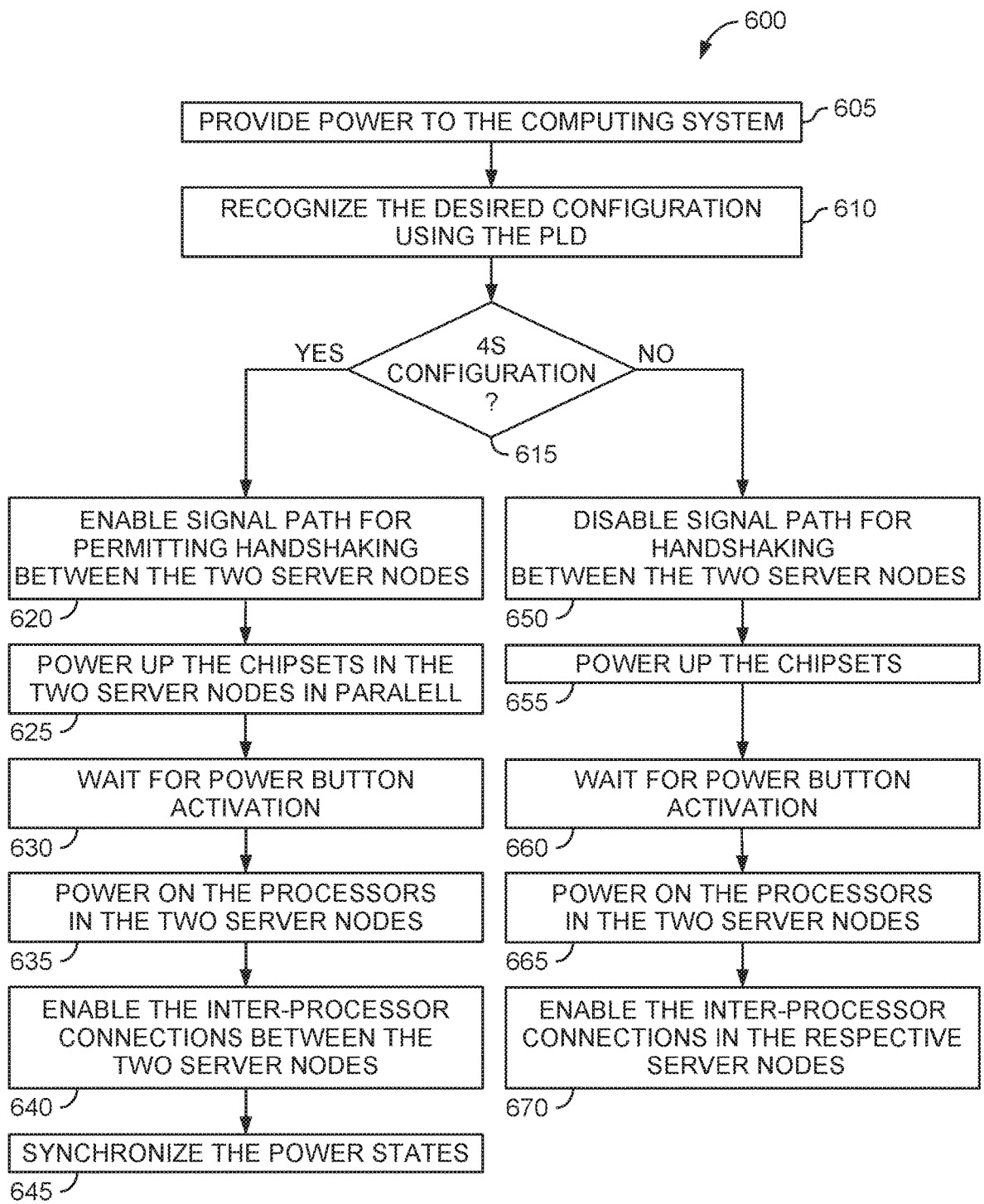
FIG. 6 is a flowchart for reconfiguring a computing system into different server configurations, according to an embodiment described herein.

FIG. 6 is a flowchart of a method 600 for reconfiguring a computing system into different server configurations, according to an embodiment described herein. At block 605, power is provided to the computing system. For example, the computing system may be mounted to a rack and its power supplies are connected to an AC or DC power source. Although a power button may not yet been activated, certain components in the computing system such as the PLD (and other components in the chipsets of the server nodes) may still receive power. That is, in a powered down state, some low-power hardware components in the computer system may be functional.

At block 610, the PLD recognizes the desired configuration of the server nodes. For example, referring to FIG. 5, the PLDs 130 may access the configuration memories 515 to determine the desired configuration of the server nodes in the computer system. At block 615, if the PLD determines the server nodes should be configured as a 4S server, the method 600 proceeds to block 620 where the PLD enables one or more signal paths for permitting handshaking between the two server nodes. In one embodiment, these signal paths are between the chipsets in the server nodes and may be located on the midplane or another connector between the two sever nodes.

At block 625, the PLD powers up the chipsets in the server nodes in parallel. In one embodiment, the various hardware components in the chipset (e.g., the PCHs, BMCs, etc.) are powered up in a predefined sequence or order. The handshaking signal paths can ensure the chipsets in the two server nodes are powered on in the same order. Further, the computer system may determine that the hardware components in the chipset are powered on in sync. That is, the PCH in one server node is powered on at the same time the PCH in the other server node.

At block 630, the computing system waits for the power button on the computing system to be activated. For example, the method 600 may be performed when the computing system is first connected to a power source. In which case, at block 630, the method 600 waits until the system administrator activates (e.g., presses) the power button on the container. However, in other embodiments, the method 600 may be performed in response to an instruction from the system administrator to change the server configuration. In which case, the method may begin at block 610 since the computing system was previously connected to power. Moreover, the method 600 may skip block 630 since the power button was previously activated and the computing system is changing to a new configuration of the server nodes.

At block 635, the PLD powers on the processors in the two server nodes. In one embodiment, the PLD performs a BIOS boot on the processors in the server nodes.

At block 640, the PLD or server nodes enable the inter-processor connections between the two server nodes to configure the server nodes as a 4S server. To do so, the PLD enables the UPI #2 ports for the processors 115 shown in FIG. 4. This permits the processors 115 to communicate directly using the inter-processor connections 300A and 300B that extend through the UPI midplane 140. In one embodiment, to achieve a ring topology, the PLD disables the UPI #1 ports which are connected to the inter-processor connections 300D and 300F. However, in other embodiments, the PLD may enable all of the UPI #1, #2, and #3 ports on the processors 115 when in the 4S server configuration.

At block 645, the PLD synchronizes the power states of the processors 115. While doing so, the PLD logs the power states of the processors (or the server nodes) and detects when the power states change successfully. In this manner, the PLD can monitor the processors to ensure their power states are synchronized, or in other words, that the power states are in tandem or are the same during the boot process.

If the power states are not synchronized, the PLD may default to the 2×2S server configuration. That is, if the power state for one of the processor does not successful change in the same way as the power states for the other processors, the PLD may stop attempting to configure the server nodes into the 4S configuration and proceed to the portion of the method 600 used to configure the nodes into the 2×2S configuration.

Returning to block 615, if the PLD determines the server nodes should be configured into the 2×2S configuration rather than the 4S configuration, the method 600 proceeds to block 650 where the PLD disables the signal path for handshaking between the two server nodes. That is, the chipsets in the two server nodes may not need to communicate (or at least, may not need to be synchronized) during the boot process. As such, the communication path for the handshaking signals between the two server nodes can be disabled.

At block 655, the PLDs power up their respective chipsets in the server nodes. As mentioned above, the chipsets may not be synchronized when being powered on. Further, rather than selecting masters and servants (e.g., a master BMC and PCH), the chipsets are independent, and thus, can operate without communication with the chipset in the other server node.

At block 660, the chipsets wait for power button activation. That is, like in block 630, the PLDs may wait until the system administrator has pressed or activated a power button on the container or chassis that holds the server nodes before completing the rest of the server configuration. However, if the server nodes were previously booted, the method 600 may skip this block. For example, if the server nodes were previously configured in the 4S configuration but now the system administrator has rebooted the computing system to configure it into the 2×2S configuration, the block 660 can be omitted.

At block 665, the respective PLDs power on the processors in the two server nodes similar to block 635. Once powered, at block 670 the PLD enables the inter-processor connections in the respective server nodes. In one embodiment, the PLD disables the UPI #2 ports shown in FIG. 3 which prevents the processors 115 in one server node from directly communicating with the processors 115 in the other server node as shown in FIG. 3. That is, when in the 2×2S configuration, the inter-processor connections 300A and 300B in the UPI midplane 140 are unused so the processor buses in the respective server nodes are not connected. However, the inter-processor connections 300C-F (and the UPI #0 and #1 ports) are used to enable communication between the processors 115 in the same server node 110.

Figure 7:
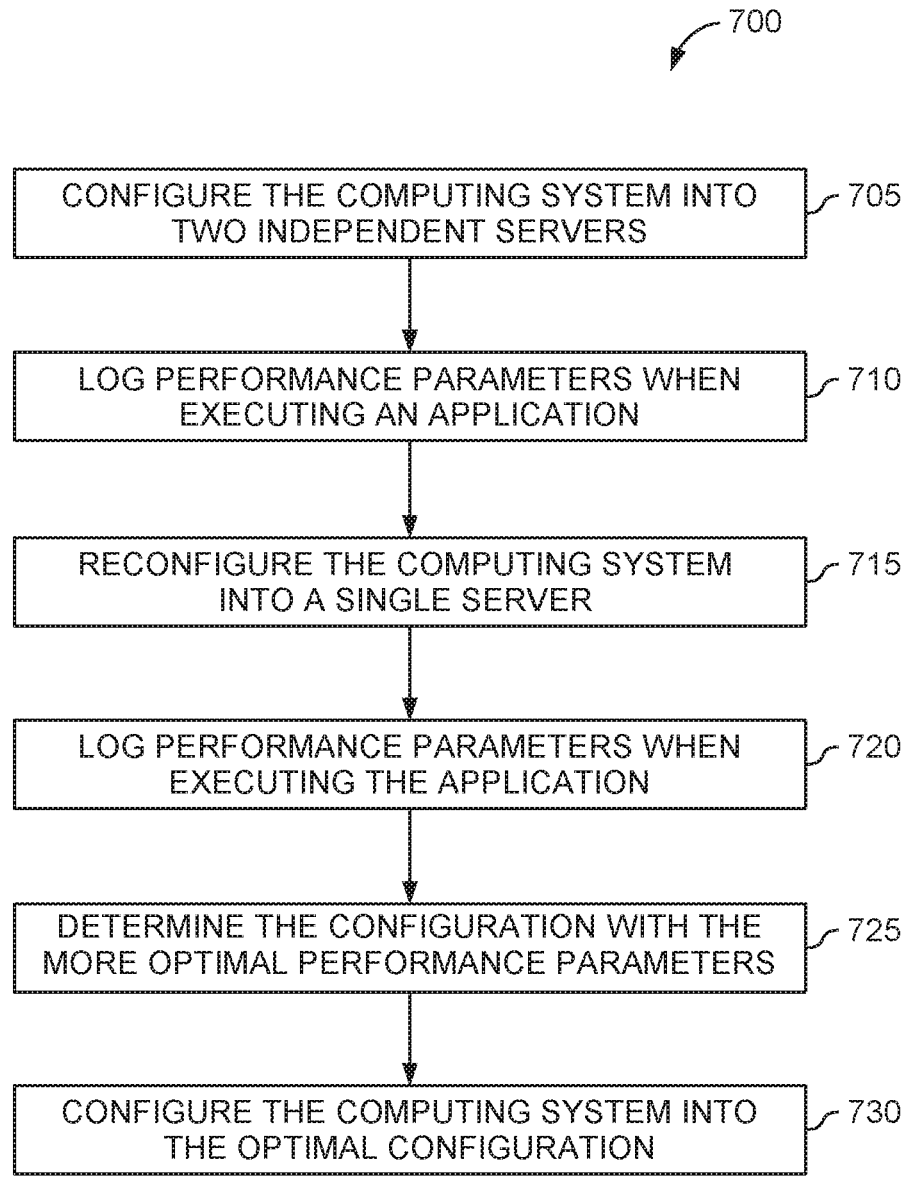
FIG. 7 is a flowchart for selecting an optimal configuration for executing an application, according to an embodiment described herein.

FIG. 7 is a flowchart of a method 700 for selecting an optimal configuration for executing an application, according to an embodiment described herein. The method 700 can be used to measure the performance of an application using two different server configurations and then automatically select (i.e., without human intervention), the optimal configuration for the application. At runtime, a system administrator may not know what server configuration—e.g., 2×2S or 4S—is the optimal configuration for the application. The method 700 permits the computing system to identify the optimal configuration and then switch to that configuration.

At block 705, the system administrator configures the computing system into two independent servers—e.g., the 2×2S server configuration. For example, using the method 600, when the computing system first boots up, the system administrator may use the management UI to instruct the PLDs to configure the server nodes as two 2S servers.

At block 710, the server nodes log performance parameters when executing an application. For example, the server nodes may log memory utilization, processor utilization, latency, buffer utilization, and the like when executing a user application—e.g., a database application.

At block 715, the PLDs reconfigure the computing system into a single server. In one embodiment, the decision to reconfigure the computing system is done without human intervention. For example, the server nodes may execute the application to log the performance parameters for a predefined period of time—e.g., a hour, day, week, etc. Once that period expires, the PLDs reboot the computing system but use the configuration memory to change the server nodes from a 2×2S configuration to a single 4S configuration.

At block 720, the server nodes log performance parameters when executing the application. That is, the server nodes can again collect performance parameters when executing the same application that was executed at block 710 but while the computing system is in the single server configuration. In one embodiment, the server nodes may log the same types of performance parameters at the blocks 710 and 720—e.g., memory utilization, processor utilization, latency, buffer utilization, and the like.

At block 725, the server nodes determine the configuration that results in more optimal performance parameters. That is, by comparing the performance parameters gathered at blocks 710 and 720, the server nodes can determine the configuration that results in the best performance when executing the application. For example, the server nodes may choose the configuration that results in the lowest memory or processor utilization.

At block 730, the server nodes configure the computing system into the optimal configuration. If the single server configuration results in the best performance, then at block 730, the server nodes remain in that configuration (since they are already configured in the single server configuration). However, if configuring the server nodes as independent servers resulted in the best performance, the PLDs may reboot the computing system and reconfigure the server nodes into two separate servers. In this manner, the server nodes can configure themselves into each configuration and identify which of these configurations results in the most optimal performance of the application without human intervention.

In one embodiment, at intervals (e.g., once a month) or after an application is updated or a new application is executed by the computing system, the method 700 may repeat. Stated differently, as the application changes or new applications are executed, the server nodes can again log new performance parameter and ensure the computing system is using the optimal configuration for executing the application or applications executing on the server nodes.

Figure 8:
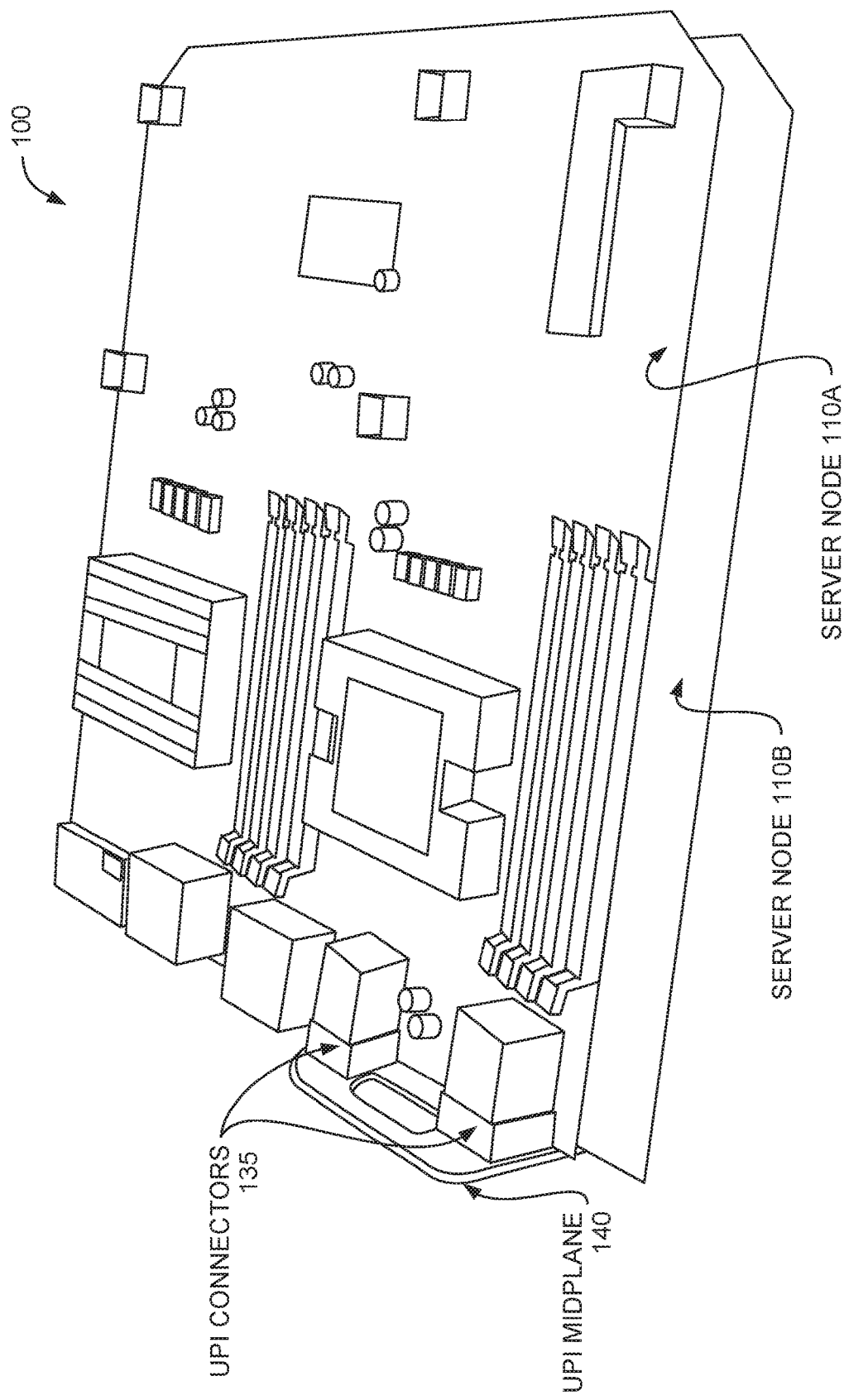
FIG. 8 illustrates a midplane connecting two server nodes, according to an embodiment described herein.

FIG. 8 illustrates a UPI midplane 140 connecting two server nodes, according to an embodiment described herein. As shown, the midplane 140 can include a board (e.g., a printed circuit board) which provides a substrate for traces that extend between the UPI connectors 135. In this embodiment, the UPI midplane 140 is connected to two pairs of UPI connectors 135 where the top pair of the connectors 135 is connected to respective sockets in the server node 110A and the bottom pair of the connectors 135) is connected to respective sockets in the server node 110б. The UPI connectors 135 connected to the server node 110б cannot be seen in FIG. 8 since the server node 110A is stacked on top of the server node 110б. The server nodes 110, the UPI midplane 140 and the UPI connectors 135 can then be encased by a container and mounted onto a rack as discussed above.

In the preceding, reference is made to embodiments presented in this disclosure. However, the scope of the present disclosure is not limited to specific described embodiments. Instead, any combination of the features and elements provided above, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages described herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

The present invention may be a system, a method, and/or a computer program product. The computer program product may include a computer-readable storage medium (or media) having computer readable program instructions thereon for causing a processor to carry out aspects of the present invention.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction(s) execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction(s) execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instruction(s)s may also be loaded onto a computer, other programmable data processing apparatus, or other devices to cause a series of operational blocks to be performed on the computer, other programmable apparatus or other devices to produce a computer implemented process such that the instruction(s)s which execute on the computer or other programmable apparatus provide processes for implementing the functions/acts specified in the flowchart and/or block diagram block or blocks.

The flowchart and block diagrams in the FIGS. illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

We claim:

1. A computing system, comprising:
    a first server node comprising a first socket corresponding to a first processor in the first server node, a second socket corresponding to a second processor in the first server node, and a third and fourth inter-processor connections between the first socket and the second socket, wherein the first server node is coupled to a backplane;
    a second server node comprising a third socket corresponding to a third processor in the second server node, and a fourth socket corresponding to a fourth processor in the second server node, and a fifth and sixth inter-processor connections between the third socket and the fourth socket, wherein the second server node is coupled to the backplane;
    a UltraPath Interconnect (UPI) midplane comprising a first inter-processor connection that is connected at a first end to the first processor of the first socket and at a second end to the third processor of the third socket and a second inter-processor connection that is connected at a first end to the second processor of the second socket and at a second end to the fourth processor of the fourth socket;
    logic configured to change the first and second server nodes to a first server configuration in which the first and second inter-processor connections are disabled, both of the third and fourth inter-processor connections are enabled, and both of the fifth and sixth inter-processor connections are enabled, in response to a user selection indicating that the first and second server should be configured as two independent servers, wherein the UPI midplane and the first and second server nodes remain physically connected, and the first and second server nodes are able to communicate with each other via the backplane when the first and second inter-processor connections are disabled; and
    the logic configured to change the first and second server nodes to a second server configuration in which the first and second inter-processor connections are enabled, one of the third and fourth inter-processor connections is disabled, one of the fifth and sixth inter-processor connections is disabled, and the processors in the first, second, third, and fourth sockets are arranged in a ring topology, in response to a user selection indicating that the first and second sever nodes should be configured as a single server, wherein the UPI midplane and the first and second server nodes remain physically connected and are able to communicate via the UPI midplane.

2. The computing system of claim 1, further comprising:
a rack mountable container comprising the first server node, the second server node, the UPI midplane, and the logic.

3. The computing system of claim 1, wherein the first server node comprises a first substrate and the second server node comprises a second substrate different from the first substrate.

4. The computing system of claim 3, wherein the substrate of the first server node and the substrate of the second server node are stacked within a container.

5. The computing system of claim 1, further comprising:
a first UltraPath Interconnect (UPI) connector that directly connects the first end of the inter-processor connection to a processor bus of the first socket; and
a second UPI connector that directly connects the second end of the inter-processor connection to a processor bus of the third socket.

6. The computing system of claim 1, further comprising:
a first controller in a chipset in the first server node; and
a second controller in a chipset in the second server node, wherein, when in the first server configuration, both of the first and second controllers are used when booting the first and second server nodes, wherein, when in the second server configuration, the first controller is a master while the second controller is on standby when booting the first and second server nodes.

7. The computing system of claim 6, wherein the first and second controllers comprise at least one of a peripheral controller hub (PCH) and baseboard management controller (BMC).

8. A method, comprising:
configuring a first server node and a second server node in a same computing system in a first server configuration, wherein the first server node comprises a first socket corresponding to a first processor in the first server node, a second socket corresponding to a second processor in the first server node, and a first controller in a first chipset, and the second server node comprises a third socket corresponding to a third processor in the second server node, a fourth socket corresponding to a fourth processor in the second server node, and a second controller in a second chipset; and
configuring the first and second server nodes in a second server configuration using a first inter-processor connection and a second inter-processor connection disposed in a UltraPath Interconnect (UPI) midplane in response to a user selection indicating that the first and second sever nodes should be configured as a single server, wherein the first inter-processor connection is connected at a first end to the first processor of the first socket and at a second end to the third processor of the third socket, the second inter-processor connection is connected at a first end to the second processor of the second socket and at a second end to the fourth processor of the fourth socket, the processors in the first, second, third, and fourth sockets are arranged in a ring topology, and the first controller is a master while the second controller is on standby when booting the first and second server nodes;
wherein the first and second inter-processor connections are unused when the first and second server nodes are in the first server configuration, wherein the UPI midplane and the first and second server nodes remain physically connected and are able to communicate with each other via a backplane coupled to the first and second server nodes when the first and second inter-processor connections are disabled, and wherein the first and second controllers are both used when booting the first and second server nodes in the first server configuration.

9. The method of claim 8, wherein the first server node, the second server node, and the UPI midplane are disposed in a rack mountable container.

10. The method of claim 8, wherein the first server node comprises a third and fourth inter-processor connections between the first socket and the second socket, wherein both of the third and fourth inter-processor connections are enabled when in the first server configuration and one of the third and fourth inter-processor connections is disabled when in the second server configuration, wherein the second server node comprises a fifth and sixth inter-processor connections between the third socket and the fourth socket, wherein both of the fifth and sixth inter-processor connections are enabled when in the first server configuration and one of the fifth and sixth inter-processor connections is disabled when in the second server configuration.

11. The method of claim 8, wherein the first server node comprises a first substrate and the second server node comprises a second substrate different from the first substrate.

12. The method of claim 11, wherein the substrate of the first server node and the substrate of the second server node are stacked within a container.

13. The method of claim 8, wherein a first UPI connector directly connects the first end of the inter-processor connection to a processor bus of the first socket and a second UPI connector directly connects the second end of the inter-processor connection to a processor bus of the third socket.

14. The method of claim 8, further comprising:
rebooting the computing system when reconfiguring the first and second server nodes, wherein, when configuring the first and second server nodes, respective power states of the first and second server nodes are synchronized.

15. The computing system of claim 1, wherein the first, second, third, and fourth sockets are arranged in the ring topology when in the second server configuration via enabling the first and second inter-processor connections, and disabling one of the third and fourth inter-processor connections and one of the fifth and sixth inter-processor connections.

16. The computing system of claim 8, wherein the first, second, third, and fourth sockets are arranged in the ring topology when in the second server configuration via enabling the first and second inter-processor connections, and disabling one of the third and fourth inter-processor connections and one of the fifth and sixth inter-processor connections.

17. A computing system, comprising:
a first server node comprising a first socket corresponding to a first processor in the first server node, a second socket corresponding to a second processor in the first server node, and a first controller in a first chipset, wherein the first server node is coupled to a backplane;
a second server node comprising a third socket corresponding to a third processor in the second server node, a fourth socket corresponding to a fourth processor in the second server node, and a second controller in a second chipset, wherein the second server node is coupled to the backplane;
a UltraPath Interconnect (UPI) midplane comprising a first inter-processor connection that is only connected at a first end to the first processor of the first socket and at a second end to the third processor of the third socket, and a second inter-processor connection that is only connected at a first end to the second processor of the second socket and at a second end to the fourth processor of the fourth socket; and
logic configured to change the first and second server nodes to a first server configuration in which the first and second inter-processor connections are disabled, in response to a user selection indicating that the first and second server should be configured as two independent servers, wherein the UPI midplane and the first and second server nodes remain physically connected, and the first and second server nodes are able to communicate with each other via the backplane when the first and second inter-processor connections are disabled, and both of the first and second controllers are used when booting the first and second server nodes; and
the logic configured to change the first and second server nodes to a second server configuration in which the first and second inter-processor connections are enabled in response to a user selection indicating that the first and second sever nodes should be configured as a single server, wherein the UPI midplane and the first and second server nodes remain physically connected and are able to communicate via the UPI midplane, and the first controller is a master while the second controller is on standby when booting the first and second server nodes.

* * * * *

UNITED STATES PATENT AND TRADEMARK OFFICE
CERTIFICATE OF CORRECTION

| | |
|---|---|
| PATENT NO. | : 11,966,350 B2 |
| APPLICATION NO. | : 16/476532 |
| DATED | : April 23, 2024 |
| INVENTOR(S) | : Anant Thakar et al. |

It is certified that error appears in the above-identified patent and that said Letters Patent is hereby corrected as shown below:

In the Drawings

In sheet 6 of 8, in FIG. 6, reference numeral 625, Line 2, delete "PARALELL" and insert -- PARALLEL --.

In the Specification

In Column 3, Line 3, delete "1108." and insert -- 110B. --.

In Column 5, Line 18, delete "1158" and insert -- 115B --.

In Column 5, Line 27, delete "1158" and insert -- 115B --.

In Column 5, Line 30, delete "1158" and insert -- 115B --.

In Column 7, Line 30, delete "sever" and insert -- server --.

In Column 10, Line 6, delete "1106." and insert -- 110B. --.

In Column 10, Line 7, delete "1106" and insert -- 110B --.

In Column 10, Line 9, delete "1106." and insert -- 110B. --.

In the Claims

In Column 12, Line 36, in Claim 1, before "a fourth" delete "and".

In Column 13, Line 3, in Claim 1, delete "sever" and insert -- server --.

Signed and Sealed this
Third Day of September, 2024

Katherine Kelly Vidal
*Director of the United States Patent and Trademark Office*

CERTIFICATE OF CORRECTION (continued)
U.S. Pat. No. 11,966,350 B2

In Column 13, Line 56, in Claim 8, delete "sever" and insert -- server --.

In Column 16, Line 11, in Claim 17, delete "sever" and insert -- server --.